(12) United States Patent
Maeda

(10) Patent No.: US 11,627,588 B2
(45) Date of Patent: Apr. 11, 2023

(54) BASE STATION, COMMUNICATION SYSTEM, COMMUNICATION METHOD, AND NON-TRANSITORY STORING MEDIUM

(71) Applicant: NEC Corporation, Tokyo (JP)

(72) Inventor: Akihide Maeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 108 days.

(21) Appl. No.: 17/258,619

(22) PCT Filed: Jul. 10, 2019

(86) PCT No.: PCT/JP2019/027297
§ 371 (c)(1),
(2) Date: Jan. 7, 2021

(87) PCT Pub. No.: WO2020/013219
PCT Pub. Date: Jan. 16, 2020

(65) Prior Publication Data
US 2021/0274518 A1    Sep. 2, 2021

(30) Foreign Application Priority Data

Jul. 12, 2018   (JP) .............................. JP2018-132331

(51) Int. Cl.
*H04W 4/44*    (2018.01)
*H04W 72/12*   (2023.01)
(Continued)

(52) U.S. Cl.
CPC ......... *H04W 72/1226* (2013.01); *H04W 4/44* (2018.02); *H04W 48/16* (2013.01); *H04W 88/08* (2013.01)

(58) Field of Classification Search
CPC ......... H04W 48/02; H04W 4/90; H04W 4/40; H04W 68/00; H04L 47/25; H04L 65/1069; H04L 1/0026; H04L 47/11
See application file for complete search history.

(56) References Cited

U.S. PATENT DOCUMENTS 6,442,405 B1 *  8/2002  Hiramatsu ........... H04B 7/0408
                                                  455/562.1
2002/0002045 A1  1/2002  Aoki et al.
(Continued)

FOREIGN PATENT DOCUMENTS

DE    102016221986 A1 *  5/2018  ............ H04W 24/02
JP    2001-230735 A       8/2001
(Continued)

OTHER PUBLICATIONS

International Search Report for PCT Application No. PCT/JP2019/027297, dated Sep. 3, 2019.
(Continued)

*Primary Examiner* — Khalid W Shaheed

(57) ABSTRACT

A base station includes: a communication circuit configured to communicate with a mobile station; a prediction circuit configured to predict a period during which communication with the mobile station is blocked; and a controller configured to control the communication circuit in such a way that communication data to be transmitted to the mobile station in the period during which communication is blocked are transmitted in a period before the period during which communication is blocked.

11 Claims, 14 Drawing Sheets

(51) Int. Cl.
  *H04W 48/16*   (2009.01)
  *H04W 88/08*   (2009.01)

(56) References Cited

U.S. PATENT DOCUMENTS

| | | |
|---|---|---|
| 2013/0107867 A1 | 5/2013 | Li et al. |
| 2016/0056904 A1 | 2/2016 | Sakaguchi et al. |

FOREIGN PATENT DOCUMENTS

| | | | | |
|---|---|---|---|---|
| JP | 2001-268625 A | 9/2001 | | |
| JP | 2010-199937 A | 9/2010 | | |
| JP | 2013-048484 A | 3/2013 | | |
| JP | 2013-522985 A | 6/2013 | | |
| JP | 2014171118 A * | 9/2014 | ............ | H04W 4/027 |
| JP | 2016-046657 A | 4/2016 | | |
| JP | 2016-131284 A | 7/2016 | | |
| WO | WO-2013021532 A1 * | 2/2013 | ............ | H04L 47/41 |

OTHER PUBLICATIONS

English translation of Written opinion for PCT Application No. PCT/JP2019/027297, dated Sep. 3, 2019.

\* cited by examiner

BASE STATION, COMMUNICATION SYSTEM, COMMUNICATION METHOD, AND NON-TRANSITORY STORING MEDIUM

This application is a National Stage Entry of PCT/JP2019/027297 filed on Jul. 10, 2019, which claims priority from Japanese Patent Application 2018-132331 filed on Jul. 12, 2018, the contents of all of which are incorporated herein by reference, in their entirety.

TECHNICAL FIELD

The present disclosure relates to a base station, a communication system, a communication method, and a communication control program.

BACKGROUND ART

There has been known a road-vehicle communication technique in which communication is performed between a mobile station and a base station installed along a moving route of the mobile station.

PTL 1 describes a road-vehicle communication technique relating to transmission of data with large capacity.

PTL 2 describes a communication system that predicts whether a failure occurs in a radio wave propagation path and performs switching from a satellite communication system to a ground communication system when occurrence of a failure is predicted.

CITATION LIST

Patent Literature

[PTL 1] Japanese Unexamined Patent Application Publication No. 2001-268625
[PTL 2] Japanese Unexamined Patent Application Publication No. 2001-230735

SUMMARY OF INVENTION

Technical Problem

In the road-vehicle communication technique described in PTL 1, a communication failure occurring between a road and a vehicle is not taken into account.

The communication system described in PTL 2 requires communication systems including both the satellite communication system and the ground communication system. Specifically, when an alternative communication system is not present, a mobile station may be in a communication-disabled situation, and there may be a risk that communication is not performed appropriately.

In view of the above-mentioned problems, an object of the present disclosure is to provide a base station, a communication system, a communication method, and a communication control program, which enable appropriate communication with a mobile station in a situation where communication may be disabled.

Solution to Problem

A base station according to the present disclosure includes: a communication means for communicating with a mobile station; a prediction means for predicting a period during which communication with the mobile station is blocked; and a control means for controlling the communication means in such a way that communication data to be transmitted to the mobile station in the period during which communication is blocked are transmitted in a period before the period during which communication is blocked.

A communication system according to the present disclosure includes the base station according to any of the aspects, and a mobile station that communicates with the base station.

A communication method according to the present disclosure includes: predicting a period during which communication with a mobile station is blocked; and controlling communication with the mobile station in such a way that communication data to be transmitted to the mobile station in the period during which communication is blocked are transmitted in a period before the period during which communication is blocked.

A communication method according to the present disclosure includes: predicting a period during which communication with a mobile station is blocked; controlling communication with the mobile station in such a way that communication data to be transmitted to the mobile station in the period during which communication is blocked are transmitted in a period before the period during which communication is blocked; and communicating according to the controlling.

A non-transitory storing medium according to the present disclosure stores a communication control program causing a computer to execute: communication processing of communicating with a mobile station; prediction processing of predicting a period during which communication with the mobile station is blocked; and control processing of controlling communication with the mobile station in such a way that communication data to be transmitted to the mobile station in the period during which communication is blocked are transmitted in a period before the period during which communication is blocked.

Advantageous Effects of Invention

Communication can be performed appropriately with a mobile station in a situation where communication may be disabled.

EXAMPLE EMBODIMENT

First Example Embodiment

Figure 1:
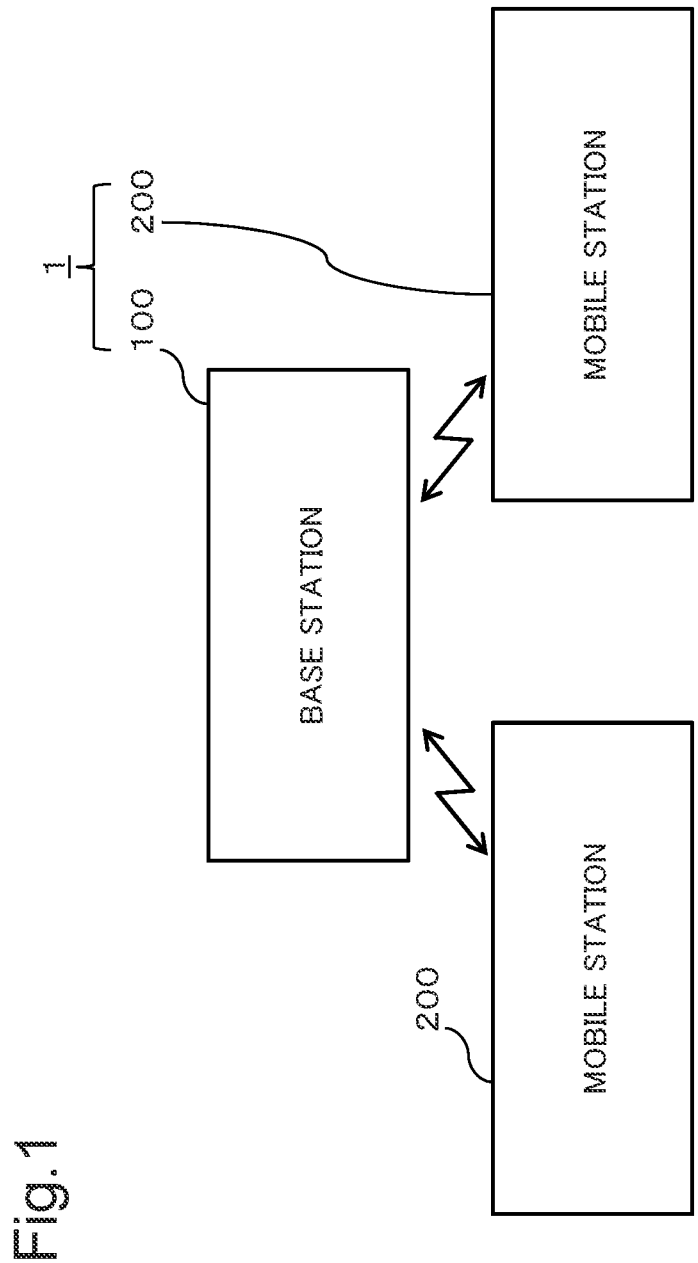
FIG. 1 is a diagram illustrating a configuration example of a communication system according to a first example embodiment.

With reference to the drawings, a communication system 1 according to a first example embodiment is described. FIG. 1 is a block diagram illustrating a configuration example of the communication system 1 according to the first example embodiment. The communication system 1 includes a base station 100 and a mobile station 200. The base station 100 and the mobile station 200 are configured to perform communication in accordance with specifications of Long Term Evolution (LTE, registered trademark) or the like, for example.

The base station 100 and the mobile station 200 can be connected to each other in order to communicate with each other via a wireless transmission path. For example, the base station 100 transmits a signal to the mobile station 200. For example, the base station 100 receives a signal transmitted from the mobile station 200. The mobile station 200 is a wireless communication device mounted to a vehicle such as an automobile. The vehicle to which the mobile station 200 is mounted is also simply referred to as a mobile station.

Figure 2:
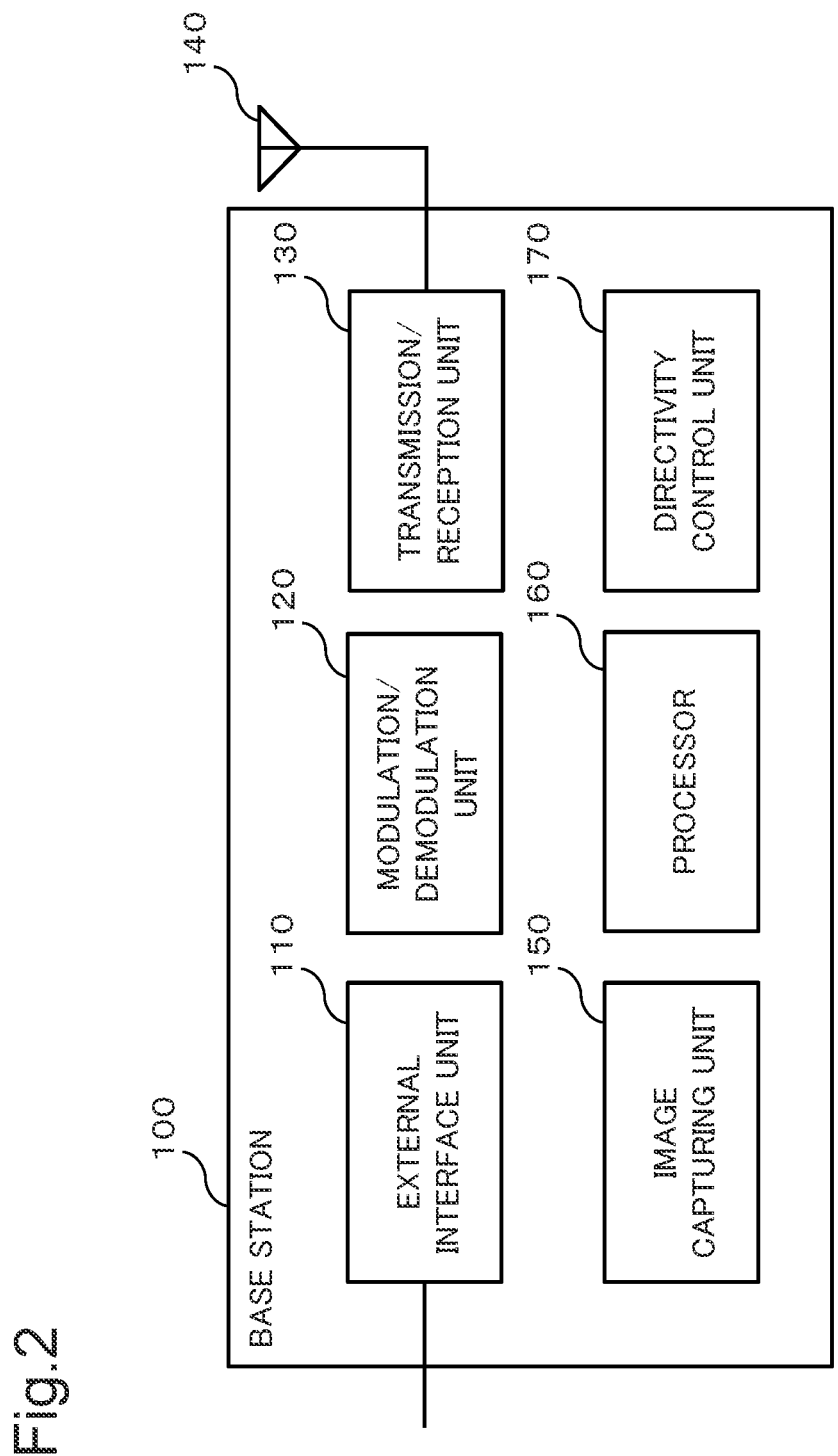
FIG. 2 is a block diagram illustrating a configuration example of a base station according to the first example embodiment.

FIG. 2 is a block diagram illustrating a configuration example of the base station 100. As illustrated in FIG. 2, the base station 100 includes an external interface unit 110, a modulation/demodulation unit 120, a transmission/reception unit 130, a variable directivity antenna 140, an image capturing unit 150, a processor 160, and a directivity control unit 170.

Communication data associated to predetermined information are input to the external interface unit 110. The external interface unit 110 inputs the communication data to the modulation/demodulation unit 120. For example, communication data destined to the mobile station 200, which have been transmitted from a core network, are input to the external interface unit 110. The communication data are image data, video data, control data, or the like. The video data are data relating to a news video being a video from a news program or the like in television broadcasts, an advertising video, or the like, for example. The control data are data relating to control information or the like required for controlling a vehicle such as an automobile and achieving automatic driving.

The modulation/demodulation unit 120 modulates a carrier wave in the communication data associated to the predetermined information. The modulation/demodulation unit 120 demodulates a carrier wave that has been modulated in predetermined communication data and transmitted by the mobile station 200, and has been received via the variable directivity antenna 140 and the transmission/reception unit 130, and acquires information associated to the predetermined communication data.

The transmission/reception unit 130 converts a frequency of the carrier wave, which has been modulated by the modulation/demodulation unit 120, into a predetermined frequency, and transmits the resultant. The transmission/reception unit 130 converts a frequency of the carrier wave, which has been transmitted from the mobile station 200 via the variable directivity antenna 140, into a predetermined frequency, and receives the resultant.

The carrier wave, which has been modulated by the modulation/demodulation unit 120 and has a frequency converted into the predetermined frequency, is transmitted to the mobile station 200 via the variable directivity antenna 140. The variable directivity antenna 140 is an antenna capable of controlling a communication direction, such as a phased array antenna.

The image capturing unit 150 captures a predetermined range. For example, when the mobile station 200 moving within the predetermined range is captured, the image capturing unit 150 acquires image information indicating an image of the mobile station 200. In this example, it is assumed that the image information is information relating to a still image, for example. The image information may be information relating to a video image.

Based on the image information acquired by the image capturing unit 150, the processor 160 estimates a position and a moving direction of the mobile station 200. Based on the image information acquired by the image capturing unit 150, the processor 160 determines whether one mobile station 200 and another mobile station 200 are in a predetermined positional relationship. A situation that the one mobile station 200 and the another mobile station 200 are in the predetermined positional relationship is that, the another mobile station 200 is present in a communication path between the one mobile station 200 and the variable directivity antenna 140, and thus communication via the communication path is blocked.

In this state, when the predetermined positional relationship is established, communication between the base station 100 and the one mobile station 200 is blocked by the another mobile station 200.

Moreover, it is assumed that a signal transmitted from the variable directivity antenna 140 to the one mobile station 200 is blocked by the another mobile station 200 and that the one mobile station 200 cannot receive the signal sufficiently. The another mobile station 200 may also be referred to as an obstacle.

The processor 160 controls the directivity control unit 170, and controls communication between the base station 100 and the mobile station 200.

When it is determined that the one mobile station 200 and the another mobile station 200 are in the predetermined positional relationship, the processor 160 inputs, to the directivity control unit 170, information indicating that the one mobile station 200 and the another mobile station 200 are in the predetermined positional relationship (hereinafter, referred to as directivity control information).

Based on the directivity control information input from the processor 160, the directivity control unit 170 controls a communication direction of the variable directivity antenna 140.

Specifically, for example, when the processor 160 determines that the one mobile station 200 and the another mobile station 200 are in the predetermined positional relationship, the directivity control unit 170 controls a communication direction of the variable directivity antenna 140 in such a way that the base station 100 can communicate with the one mobile station 200 preferentially to the another mobile station 200 before the one mobile station 200 and the another mobile station 200 are in the predetermined positional relationship.

When the one mobile station 200 and the another mobile station 200 are in the predetermined positional relationship, it is assumed that the base station 100 cannot sufficiently transmit/receive information to/from the one mobile station 200. In view of this, the directivity control unit 170 controls a communication direction of the variable directivity antenna 140 in such a way that communication data, which are to be transmitted while the one mobile station 200 and the another mobile station 200 are in the predetermined positional relationship, can be transmitted before the one mobile station 200 and the another mobile station 200 are in the predetermined positional relationship, for example.

When the processor 160 determines that the one mobile station 200 and the another mobile station 200 are not in the predetermined positional relationship, the directivity control unit 170 controls a communication direction of the variable directivity antenna 140 in such a way that communication is performed equally with the plurality of mobile stations 200.

Specific operations of the processor 160 and the directivity control unit 170 are described later.

Figure 3:
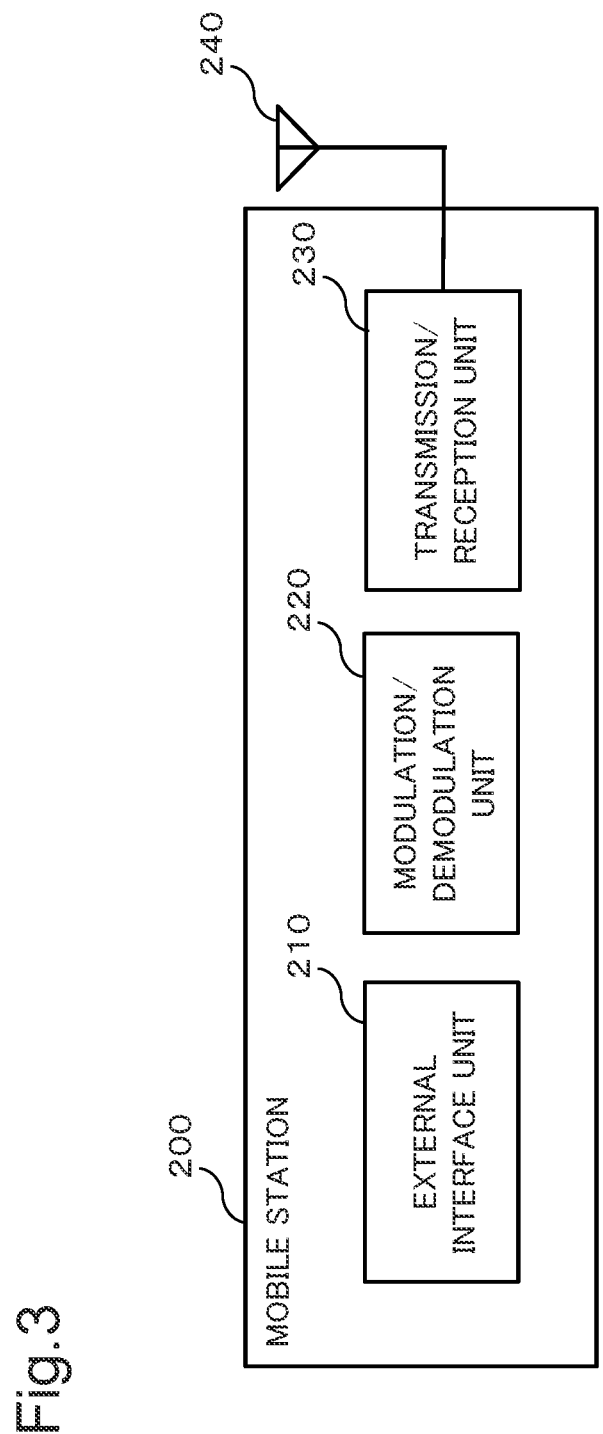
FIG. 3 is a block diagram illustrating a configuration example of a mobile station according to the first example embodiment.

FIG. 3 is a block diagram illustrating a configuration example of the mobile station 200. As illustrated in FIG. 3, the mobile station 200 includes an external interface unit 210, a modulation/demodulation unit 220, and a transmission/reception unit 230, and is connected to an antenna 240.

Communication data associated to the predetermined information is input to the external interface unit 210, based on an operation performed by a user of the mobile station 200. The communication data are image data, video data, control data, or the like, for example. The video data are video data or the like recorded by a drive recorder, for example. The control data are data relating to control information or the like required for controlling a vehicle such as an automobile and achieving automatic driving, for example.

The modulation/demodulation unit 220 modulates a carrier wave in the communication data associated to the predetermined information. The modulation/demodulation unit 220 demodulates a carrier wave that has been modulated in predetermined communication data and transmitted by the base station 100, and has been received via the antenna 240 and the transmission/reception unit 230, and acquires information associated to the communication data.

The transmission/reception unit 230 converts a frequency of the carrier wave, which has been modulated by the modulation/demodulation unit 220, into a predetermined frequency, and transmits the resultant. The transmission/reception unit 230 converts a frequency of the carrier wave, which has been transmitted from the base station 100 via the antenna 240, into a predetermined frequency, and receives the resultant.

The carrier wave, which has been modulated by the modulation/demodulation unit 220 and has a frequency converted into the predetermined frequency, is transmitted to the base station 100 via the antenna 240.

Here, with reference to the drawings, a specific operation of the base station 100 is described in detail.

Figure 4:
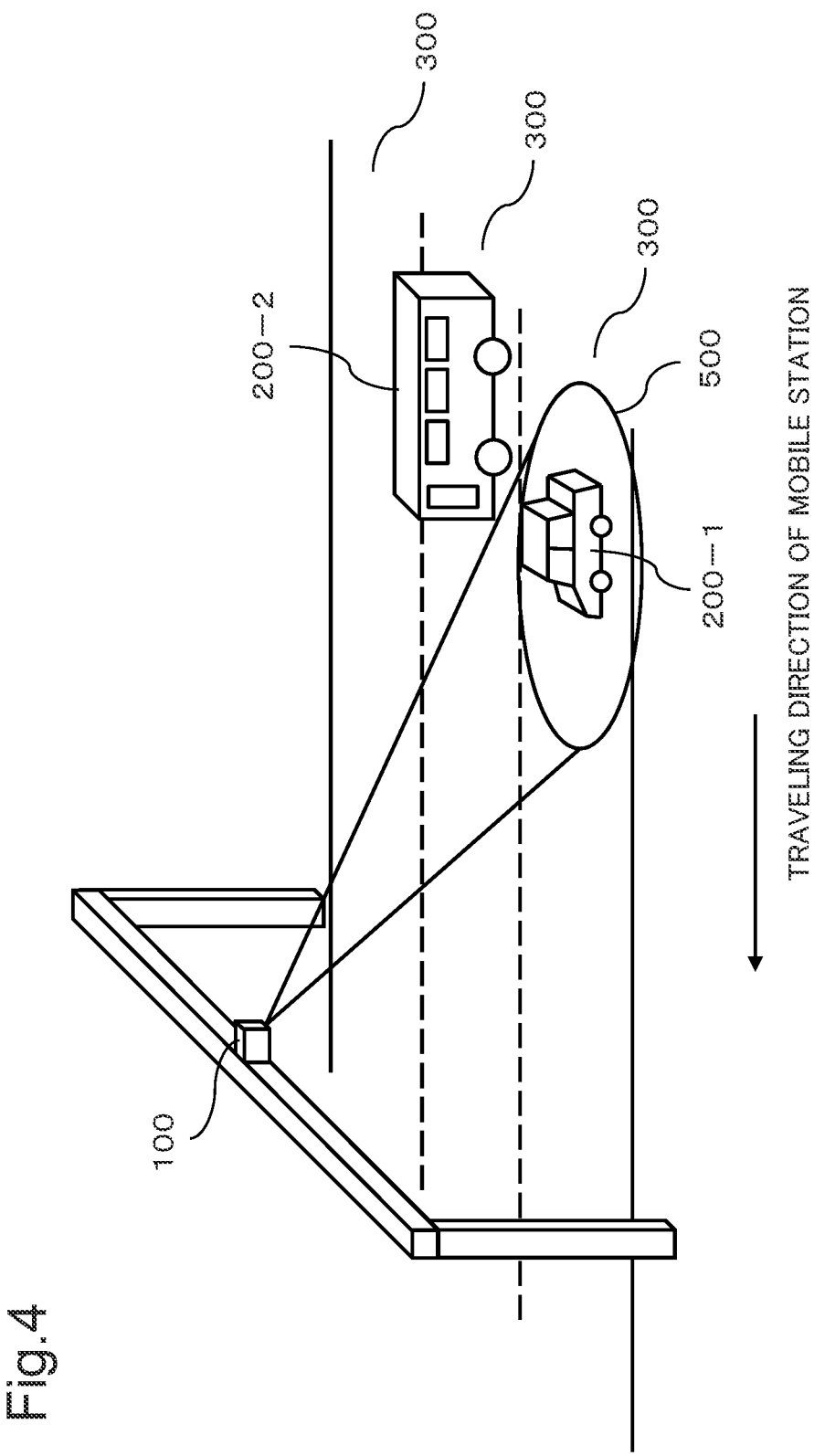
FIG. 4 is a diagram illustrating the base station and mobile stations according to the first example embodiment.

FIG. 4 is a diagram illustrating a situation in which the base station 100 according to the present example embodiment is installed above roadways 300 and a mobile station 200-1 and a mobile station 200-2 travel on the roadways 300. In this example, the mobile station 200-1 and the mobile station 200-2 are vehicles such as automobiles. For example, the base stations 100 may be installed along the roadways 300 at an interval of several hundred meters. The communication system 1 may be configured in such a way that the plurality of base stations 100 are operated in conjunction with each other.

The mobile station 200-1 is a vehicle such as a standard-sized vehicle. The mobile station 200-2 is a large-sized vehicle larger than the mobile station 200-1. The mobile station 200-2 is a bus or the like, for example.

In the example illustrated in FIG. 4, the mobile station 200-1 and the mobile station 200-2 travel in parallel to each other under a state in which the mobile station 200-1 is ahead of the mobile station 200-2 in a traveling direction.

As illustrated in FIG. 4, road-vehicle communication is performed between the base station 100 and the mobile station 200-1 or the mobile station 200-2. For example, the base station 100 controls a communication direction of the variable directivity antenna 140, and moves a communication area 500 indicating a range enabling communication with the base station 100, in such a way that the mobile station 200-1 or the mobile station 200-2 is within the communication area 500. When the mobile station 200-1 is within the communication area 500, the base station 100 is communicable with the mobile station 200-1. When the mobile station 200-2 is within the communication area 500, the base station 100 is communicable with the mobile station 200-2. A size or the like of the communication area 500 can be changed in accordance with performance or the like of the variable directivity antenna 140 to be used.

The base station 100 is installed at a position where the image capturing unit 150 of the base station 100 can capture the mobile station 200-1 and the mobile station 200-2 traveling on the roadways 300. The image information acquired by the image capturing unit 150 includes information indicating the mobile station 200-1 and the mobile station 200-2.

Figure 5:
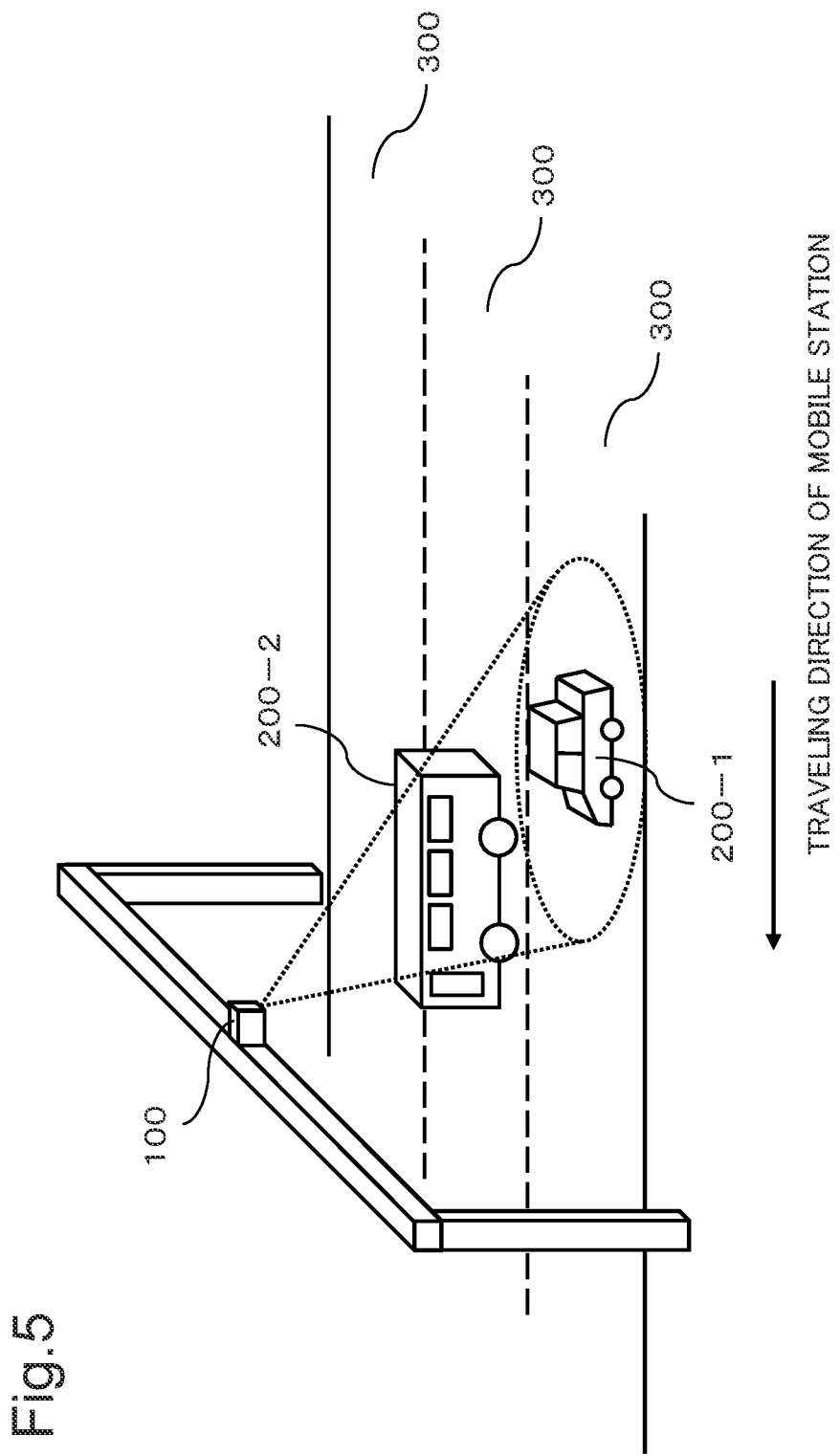
FIG. 5 is a diagram illustrating the base station and the mobile stations according to the first example embodiment.

FIG. 5 is a diagram illustrating a situation after a predetermined time period elapses from the situation illustrated in FIG. 4. When the mobile station 200-2 travels at a speed higher than that of the mobile station 200-1, it is assumed that the mobile station 200-2 passes the mobile station 200-1 after the predetermined time period elapses, as illustrated in FIG. 5. In this situation the mobile station 200-1 and the mobile station 200-2 are in the predetermined positional relationship, and there may be a risk in that the base station 100 cannot communicate with the mobile station 200-1. In view of this, as described below, the base station 100 determines that the mobile station 200-1 and the mobile station 200-2 are in the predetermined positional relationship, and controls the variable directivity antenna 140.

Specifically, based on the image information acquired by the image capturing unit 150, the processor 160 recognizes presence and positions of the mobile station 200-1 and the mobile station 200-2. In this state, the processor 160 may be configured to recognize shapes and sizes of the mobile station 200-1 and the mobile station 200-2. For example, the processor 160 may be configured to recognize presence and positions of the mobile station 200-1 and the mobile station 200-2 by detecting presence of number plates of the mobile station 200-1 and the mobile station 200-2, which are included in a still image acquired in the image capturing unit 150. For example, the base station 100 may be configured to include a storage means that stores information in which a still image of a front section of a vehicle and a vehicle type, and a shape, a size, or the like of a vehicle are associated to each other. The processor 160 may be configured to recognize a vehicle type, a shape of a vehicle, a size of a vehicle, or the like, based on a still image acquired by the image capturing unit 150 and the information stored in the storage means.

Subsequently, based on the image information acquired by the image capturing unit 150, the processor 160 recognizes traveling directions and traveling speeds of the mobile station 200-1 and the mobile station 200-2. For example, the processor 160 may be configured to recognize feature points included in each of a plurality of still images acquired by the image capturing unit 150, and to recognize the traveling directions and the traveling speeds of the mobile station 200-1 and the mobile station 200-2, based on change in coordinate values of the feature points or the like. The processor 160 may be configured to recognize a size and a shape of the roadway 300, based on a still image acquired by the image capturing unit 150.

Based on the recognized information, the processor 160 determines whether the mobile station 200-1 and the mobile station 200-2 are in the predetermined positional relationship. Specifically, for example, the processor 160 may be configured to recognize that the mobile station 200-2 travels at a speed higher than that of the mobile station 200-1 and to determine whether the situation illustrated in FIG. 5 is established after the predetermined time period elapses from the current time point, based on an installation position of the variable directivity antenna 140, a performance value (a radiation pattern or the like) relating to directivity of the variable directivity antenna 140, a size and a shape of the roadway 300, information indicating a traveling direction of the mobile station, and the like. The processor 160 may be configured to determine whether the mobile station 200-1 and the mobile station 200-2 are in the predetermined positional relationship while additionally considering a lighting situation of a device that indicates a traveling direction of a vehicle, such as direction indicators or the like included in the mobile station 200-1 and the mobile station 200-2. For example, the processor 160 may be configured to recognize a lighting situation of direction indicators or the like, based on a plurality of still images acquired by the image capturing unit 150.

Based on the recognized information described above, the processor 160 estimates a period during which the mobile station 200-1 and the mobile station 200-2 are in the predetermined positional relationship. Specifically, for example, the processor 160 may be configured to estimate the period, based on traveling speeds, traveling directions, and sizes of the mobile station 200-1 and the mobile station 200-2, a performance value (a radiation pattern or the like) relating to directivity of the variable directivity antenna 140, or the like. The period during which the mobile station 200-1 and the mobile station 200-2 are in the predetermined positional relationship is equivalent to a period during which communication between the base station 100 and the mobile station 200-1 is blocked.

When the processor 160 estimates the period during which the mobile station 200-1 and the mobile station 200-2 are in the predetermined positional relationship, the directivity control unit 170 controls a communication direction of the variable directivity antenna 140 in such a way that the base station 100 can communicate with the mobile station 200-1 preferentially to the mobile station 200-2 before the mobile station 200-1 and the mobile station 200-2 are in the predetermined positional relationship.

Figure 6:
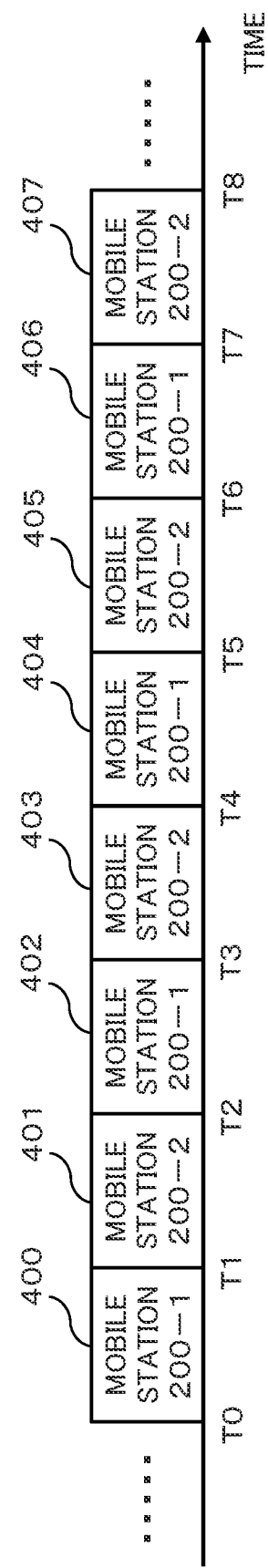
FIG. 6 is a diagram illustrating time slots relating to wireless communication between the base station and the mobile stations.

FIG. 6 is a diagram illustrating time slots relating to wireless communication between the base station and the mobile stations. In this example, as illustrated in FIG. 6, it is considered that there is given a case where the wireless communication between the base station and each of the mobile stations is performed by a time division multiple access method and a time slot for the mobile station 200-1 and a time slot for the mobile station 200-2 are alternately set. Specifically, it is assumed that communication between the base station 100 and the mobile station 200-1 and communication between the base station 100 and the mobile station 200-2 are alternately performed.

Figure 7:
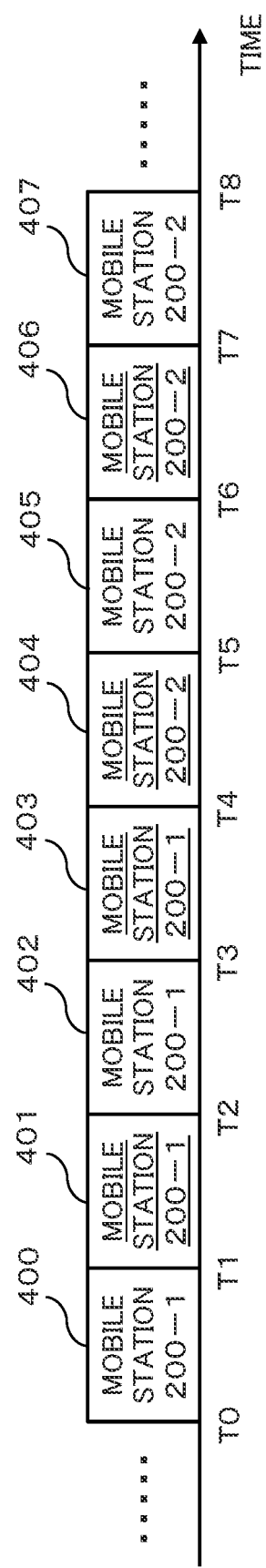
FIG. 7 is a diagram illustrating time slots relating to wireless communication between the base station and the mobile stations after settings are changed.

In this case, it is determined that the mobile station 200-1 and the mobile station 200-2 are in the predetermined positional relationship in a period from a time T4 to a time T8, and this case is considered. FIG. 7 is a diagram illustrating time slots relating to wireless communication between the base station and the mobile stations after setting is changed.

In this state, as illustrated in FIG. 7, the processor 160 sets a time slot 401 and a time slot 403, which have been set for the mobile station 200-2, to be used for communication with the mobile station 200-1. During a period from a time T0 to the time T4 illustrated in FIG. 7, the directivity control unit 170 controls a communication direction of the variable directivity antenna 140 in such a way as to perform communication with the mobile station 200-1.

As illustrated in FIG. 7, the processor 160 sets a time slot 404 and a time slot 406, which have been set for the mobile station 200-1, to be used for communication with the mobile station 200-2. In the period from the time T4 to the time T8 illustrated in FIG. 7, the directivity control unit 170 controls a communication direction of the variable directivity antenna 140 in such a way as to perform communication with the mobile station 200-2.

For example, in accordance with control performed by the directivity control unit 170, a communication direction of the variable directivity antenna 140 is alternately switched between a direction to the mobile station 200-1 and a direction to the mobile station 200-2.

Specifically, for example, in the period from the time T0 to the time T4 illustrated in FIG. 7, the directivity control unit 170 controls a communication direction of the variable directivity antenna 140 in such that the base station 100 can communicate with the mobile station 200-1. Specifically, the directivity control unit 170 controls a communication direction of the variable directivity antenna 140 in such a way that the mobile station 200-1 is within the communication area 500. In the period from the time T0 to the time T4, the base station 100 transmits a signal to the mobile station 200-1.

For example, in the period from the time T4 to the time T8 illustrated in FIG. 7, the directivity control unit 170 controls a communication direction of the variable directivity antenna 140 in such a way that the base station 100 can communicate with the mobile station 200-2. Specifically, the directivity control unit 170 controls a communication direction of the variable directivity antenna 140 in such a way that the mobile station 200-2 is within the communication area 500. Specifically, for example, when the processor 160 determines that the time T4 has come, the directivity control unit 170 controls a communication direction of the variable directivity antenna 140 in such a way that the mobile station 200-2 is within the communication area 500 in the period from the time T4 to the time T8. The base station 100 transmits a signal to the mobile station 200-2 in the period from the time T4 to the time T8. During a period after the time T8, the processor 160 may be configured to alternately set a time slot for the mobile station 200-1 and a time slot for the mobile station 200-2. The processor 160 may be configured to determine whether the time T8 has come. When the processor 160 determines that the time T8 has come, the base station 100 communicates alternately with the mobile station 200-1 or the mobile station 200-2.

The processor 160 and the directivity control unit 170 may be configured to control a communication direction of the variable directivity antenna 140 in such a way that the communication area 500 is caused to follow a motion of the mobile station 200, based on image information captured by the image capturing unit 150.

FIG. 7 illustrates the example in which all the time slots in the period from the time T0 to the time T4 are set for the mobile station 200-1, but it may be configured that time slots set for the mobile station 200-1 and the mobile station 200-2 are determined in such a way that the number of time slots set for the mobile station 200-1 is greater than the number of time slots set for the mobile station 200-2 in the period from the time T0 to the time T4. Specifically, for example, it may be configured that the time slots 400, 401, and 402 are set for the mobile station 200-1 and that the time slot 403 is set for the mobile station 200-2.

The time slot may also be referred to as a wireless resource specified with a frequency component and a time component. The expression "the time slot is set" may also be referred to as an expression "the wireless resource is allocated".

Figure 8:
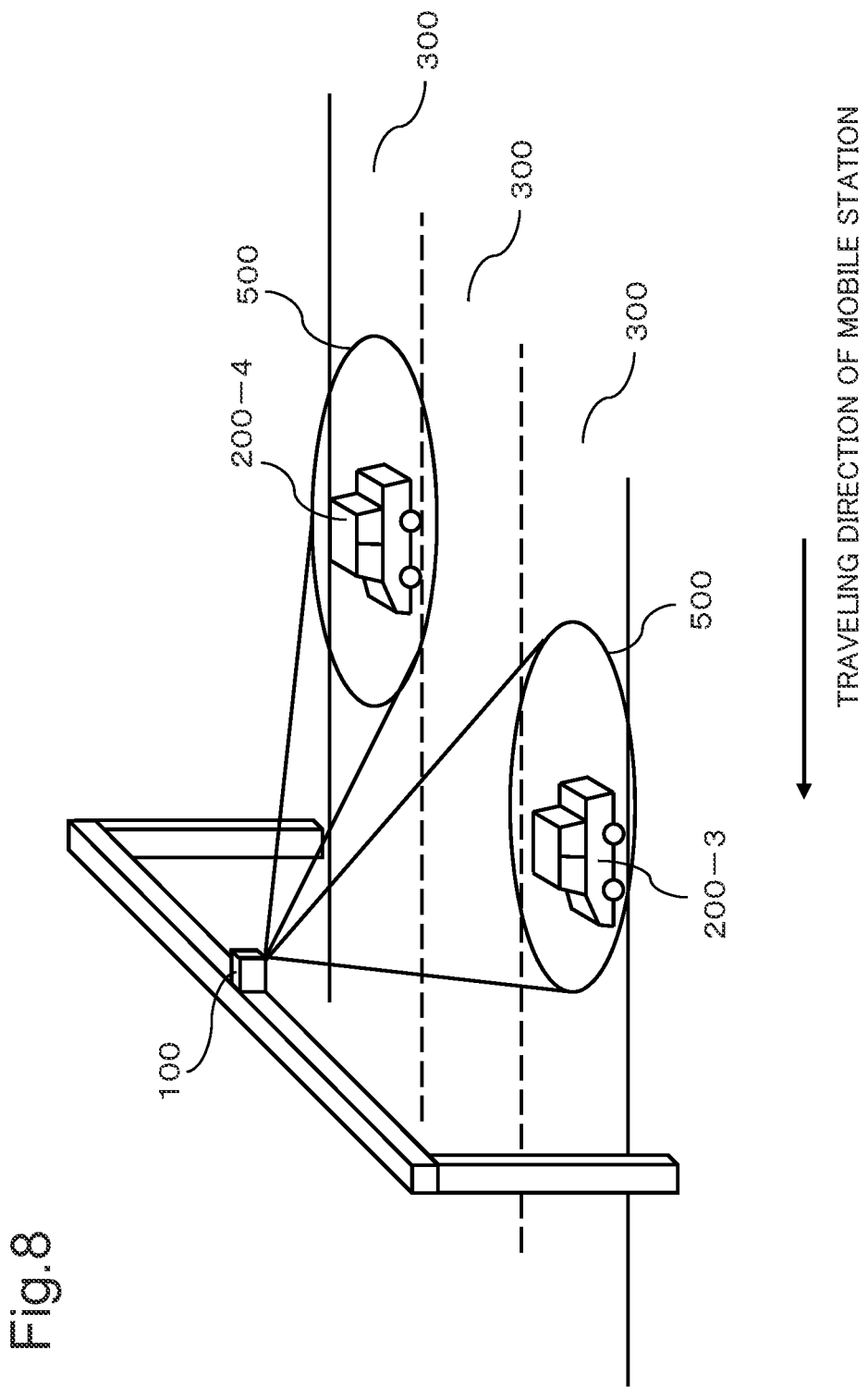
FIG. 8 is a diagram illustrating the base station and mobile stations according to the first example embodiment.

FIG. 8 is a diagram illustrating a situation in which the base station 100 according to the present example embodiment is installed above the roadways 300 and a mobile station 200-3 and a mobile station 200-4 travel on the roadways 300. In this example, the mobile station 200-3 and the mobile station 200-4 are vehicles such as standard-sized automobiles. For example, the base stations 100 may be installed along the roadways 300 at an interval of several hundred meters.

As illustrated in FIG. 8, road-vehicle communication is performed between the base station 100 and the mobile station 200-3 or the mobile station 200-4. For example, the base station 100 controls a communication direction of the variable directivity antenna 140 in such a way that the mobile station 200-3 or the mobile station 200-4 is within the communication area 500 indicating a range enabling communication with the base station 100. When the mobile station 200-3 is within the communication area 500, the base station 100 is communicable with the mobile station 200-3. When the mobile station 200-4 is within the communication area 500, the base station 100 is communicable with the mobile station 200-4. A size or the like of the communication area 500 can be changed in accordance with performance or the like of the variable directivity antenna 140 to be used.

As illustrated in FIG. 8, the base station 100 is installed at a position where the image capturing unit 150 of the base station 100 can capture the mobile station 200-3 and the mobile station 200-4 traveling on the roadways 300.

FIG. 8 illustrates a situation where the mobile station 200-3 and the mobile station 200-4 are not in the predetermined positional relationship. Both the mobile station 200-3 and the mobile station 200-4 are standard-sized automobiles, and those stations travel on the roadways 300 on both sides. Therefore, based on the method described above, the processor 160 determines that the mobile station 200-3 and the mobile station 200-4 are not in the predetermined positional relationship.

Figure 9:
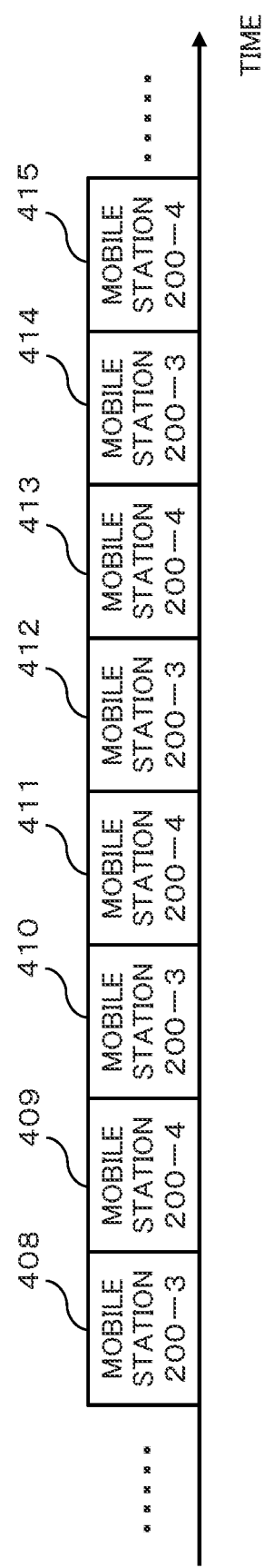
FIG. 9 is a diagram illustrating time slots relating to wireless communication between the base station and the mobile stations.

In this case, the base station 100 communicates with the mobile station 200-3 and the mobile station 200-4 equally in terms of time. FIG. 9 is a diagram illustrating time slots relating to wireless communication between the base station and the mobile stations. Specifically, for example, as illustrated in FIG. 9, when the wireless communication between the base station 100 and the mobile station 200 is performed by a time division multiple access method, the processor 160 alternately sets a time slot for the mobile station 200-3 and a time slot for the mobile station 200-4.

The directivity control unit 170 controls a communication direction of the variable directivity antenna 140 in such a way that the base station 100 can communicate with the mobile station 200-3 or the mobile station 200-4 in accordance with a set time slot. Specifically, in accordance with control performed by the directivity control unit 170, a communication direction of the variable directivity antenna 140 is alternately switched between a direction to the mobile station 200-3 and a direction to the mobile station 200-4.

Specifically, for example, in a time slot 408 illustrated in FIG. 9, the directivity control unit 170 controls a communication direction of the variable directivity antenna 140 in such a way that the base station 100 can communicate with the mobile station 200-3. Specifically, as illustrated in FIG. 8, the directivity control unit 170 controls a communication direction of the variable directivity antenna 140 in such a way that the mobile station 200-3 is within the communication area 500.

For example, in a time slot 409 illustrated in FIG. 9, the directivity control unit 170 controls a communication direction of the variable directivity antenna 140 in such a way that the base station 100 can communicate with the mobile station 200-4. Specifically, as illustrated in FIG. 8, the directivity control unit 170 controls a communication direction of the variable directivity antenna 140 in such a way that the mobile station 200-4 is within the communication area 500.

Figure 10:
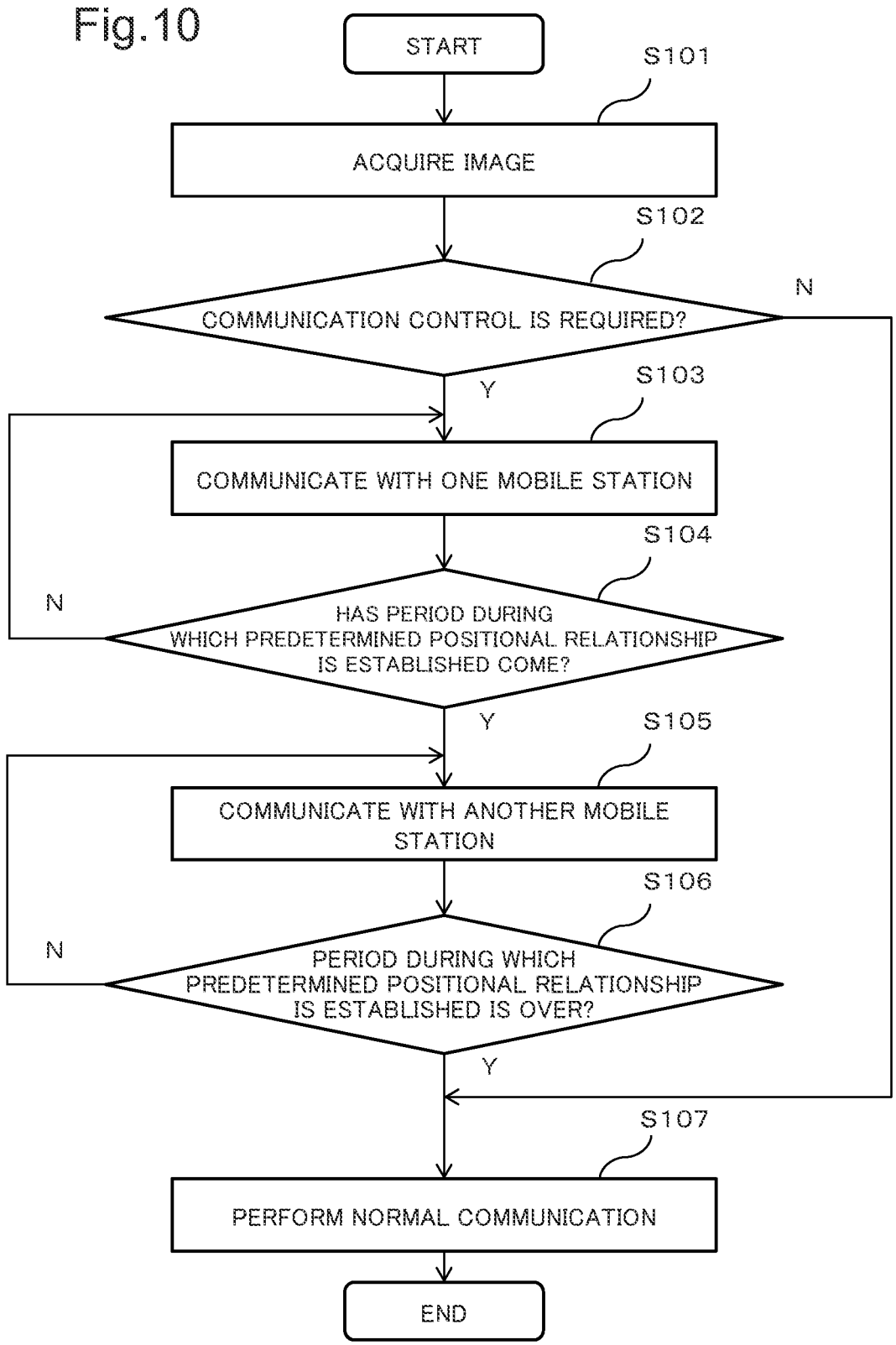
FIG. 10 is a flowchart illustrating communication processing executed by the base station according to the first example embodiment.

FIG. 10 is a flowchart illustrating communication processing executed by the base station 100.

The image capturing unit 150 acquires image information relating to the mobile station 200 (Step S101).

The processor 160 uses the above-mentioned method, and determines whether the one mobile station 200 and the another mobile station 200 are in the predetermined positional relationship, based on the image information acquired by the image capturing unit 150 (Step S102).

When the processor 160 determines that the one mobile station 200 and the another mobile station 200 are in the predetermined positional relationship (Y in Step S102), the base station 100 communicates with the one mobile station (Step S103). Specifically, for example, the processor 160 uses the above-mentioned method, and estimates the period during which the one mobile station 200 and the another mobile station 200 are in the predetermined positional relationship. The processor 160 changes settings in such a way that a time slot set for the another mobile station 200 is used for communication with the one mobile station 200 in a period before the period during which the one mobile station 200 and the another mobile station 200 are in the predetermined positional relationship. The processor 160 changes settings in such a way that a time slot set for the one mobile station 200 is used for communication with the another mobile station 200 in the period during which the one mobile station 200 and the another mobile station 200 are in the predetermined positional relationship. The directivity control unit 170 controls a communication direction of the variable directivity antenna 140 in such a way that communication can be performed with the one mobile station 200 in the period before the period during which the one mobile station 200 and the another mobile station 200 are in the predetermined positional relationship. The base station 100 transmits a signal to the one mobile station 200.

The processor 160 determines whether a period during which the predetermined positional relationship is established comes (Step S104). Specifically, for example, the processor 160 determines whether the time T4 illustrated in FIG. 7 has come.

When the processor 160 determines that the period during which the predetermined positional relationship is established comes (Y in Step S104), the base station 100 communicates with the another mobile station (Step S105). Specifically, for example, the directivity control unit 170 controls a communication direction of the variable directivity antenna 140 in such a way that communication can be performed with the another mobile station 200 in the period during which the one mobile station 200 and the another mobile station 200 are in the predetermined positional relationship. The base station 100 transmits a signal to the another mobile station 200.

When the processor 160 determines that the period during which the predetermined positional relationship is established does not come (N in Step S104), the procedure is shifted to the processing in Step S103. Specifically, for example, the base station 100 continues transmission of a signal to the one mobile station 200.

The processor 160 determines whether the period during which the predetermined positional relationship is established is over (Step S106). Specifically, for example, the processor 160 determines whether the time T8 illustrated in FIG. 7 has come.

When the processor 160 determines that the period during which the predetermined positional relationship is established is over (Y in Step S106), the base station 100 terminates the processing in Step S105, and returns to normal communication (S107). Specifically, for example, when a time slot for the one mobile station 200 and a time slot for the another mobile station 200 are alternately set, the base station 100 communicates alternately with the one mobile station 200 or the another mobile station 200, based on the set time slots.

When the processor 160 determines that the period during which the predetermined positional relationship is established is not over (N in Step S106), the procedure is shifted to the processing in Step S105. Specifically, for example, the base station 100 continues transmission of a signal to the another mobile station 200.

When the processor 160 determines that the one mobile station 200 and the another mobile station 200 are not in the predetermined positional relationship (N in Step S102), the base station 100 performs normal communication with the mobile station 200 (Step S107). Specifically, for example, the processor 160 does not change settings of a time slot for the one mobile station 200 and a time slot for the another mobile station 200.

Specifically, the time slot for the one mobile station 200 and the time slot for the another mobile station 200 remain to be alternately set. The base station 100 communicates alternately with the one mobile station 200 or the another mobile station 200, based on the set time slots.

According to the present example embodiment, the base station 100 determines whether the one mobile station 200 and the another mobile station 200 are in the predetermined positional relationship, based on the image information acquired by the image capturing unit 150. When the base station 100 determines that the one mobile station 200 and the another mobile station 200 are in the predetermined positional relationship, the time slot set for the another mobile station 200 is used for communication with the one mobile station 200.

According to this configuration, the base station can appropriately communicate with the mobile station in a situation where communication may be disabled. For example, when there is a risk in that communication between the base station and the one mobile station is disrupted, the base station can allocate a wireless line to the one mobile station preferentially to the another mobile station.

For example, in a period during which there may be a risk in that communication between the base station and the one mobile station is disrupted, the base station communicates with the another mobile station. Therefore, the base station can improve usage efficiency of the wireless line.

For example, the base station controls the variable directivity antenna, based on the acquired image information. Therefore, a position and a moving direction of the mobile station can be recognized appropriately, and a communication direction of the variable directivity antenna can be controlled efficiently.

It may be configured that communication between the base station and the mobile station is performed through use of a millimeter wave band, a micro wave band (ultra high frequency (UHF) band, etc.), or the like.

It may be configured that a plurality of variable directivity antennas 140 are installed. For example, the directivity control unit 170 may be configured to select a variable directivity antenna 140 that radiates an electric wave among the plurality of variable directivity antennas 140. According to this configuration, the base station 100 can select the variable directivity antenna 140 that is appropriate for communication between the base station 100 and the mobile station 200.

The base station 100 may be configured to include a storage means storing information in which image information (hereinafter, also referred to as past image information) acquired by capturing the mobile station 200-1 and the mobile station 200-2 in the past and information indicating temporal transition of communication quality (a bit error rate, etc.) between the mobile station 200-1 and the base station 100 are associated to each other. For example, the information indicating temporal transition of communication quality between the mobile station 200-1 and the base station 100 includes information indicating communication quality from a time at which the past image information is captured to a predetermined time.

The base station 100 specifies the past image information relevant to the acquired image information, based on the acquired image information and the information stored in the storage means. For example, the base station 100 may be configured to compare feature points in the acquired image information and feature points in the past image information and to specify the past image information relevant to the acquired image information, based on a matching degree of those feature points.

The base station 100 determines whether the mobile station 200-1 and the mobile station 200-2 are in the predetermined positional relationship, based on the information indicating temporal transition of communication quality, which is associated with the past image information.

For example, based on the information indicating temporal transition of communication quality, which is associated with the specified past image information and the time at which the image information is acquired, the base station 100 determines whether communication quality between the mobile station 200-1 and the base station 100 is degraded after the time. When it is determined that communication quality between the mobile station 200-1 and the base station 100 is degraded after the time, the base station 100 determines that the mobile station 200-1 and the mobile station 200-2 are in the predetermined positional relationship.

FIG. 4, FIG. 5, and FIG. 8 illustrate a case where the base station 100 is installed in such a way as to transmit a signal to the mobile station 200 from a front side of the mobile station 200 in the traveling direction, but the base station 100 may be installed in such a way as to transmit a signal to the mobile station 200 from a rear side of the mobile station 200 in the traveling direction. The communication system 1 may be configured in such a way that the plurality of base stations 100 are operated in conjunction with each other and that the plurality of base stations 100 transmit signals to the mobile station 200 from the front side of the mobile station 200 in the traveling direction and the rear side of the mobile station 200 in the traveling direction.

The image information processed by the processor 160 may be constituted of the captured image data themselves, or may be constituted of numeral value information or the like extracted by subjecting the image data to predetermined processing. In a case where a data capacity is small, a processing load of the processor 160 can be reduced when the numeral value information is utilized in place of the image data themselves.

FIG. 4, FIG. 5, and FIG. 8 illustrate the example in which the base station 100 communicates with the two mobile stations, but the base station 100 may be configured to communicate with three or more mobile stations.

The external interface unit 110, the modulation/demodulation unit 120, and the transmission/reception unit 130 are achieved by a transmission circuit and a reception circuit.

The image capturing unit 150 is achieved by a central processing unit (CPU) that executes processing in accordance with program control, a plurality of circuits, a memory, a camera, and the like.

The processor 160 and the directivity control unit 170 are achieved by a CPU that executes processing in accordance with program control, a plurality of circuits, a memory, and the like.

The external interface unit 210, the modulation/demodulation unit 220, and the transmission/reception unit 230 are achieved by a transmission circuit and a reception circuit.

Second Example Embodiment

Figure 11:
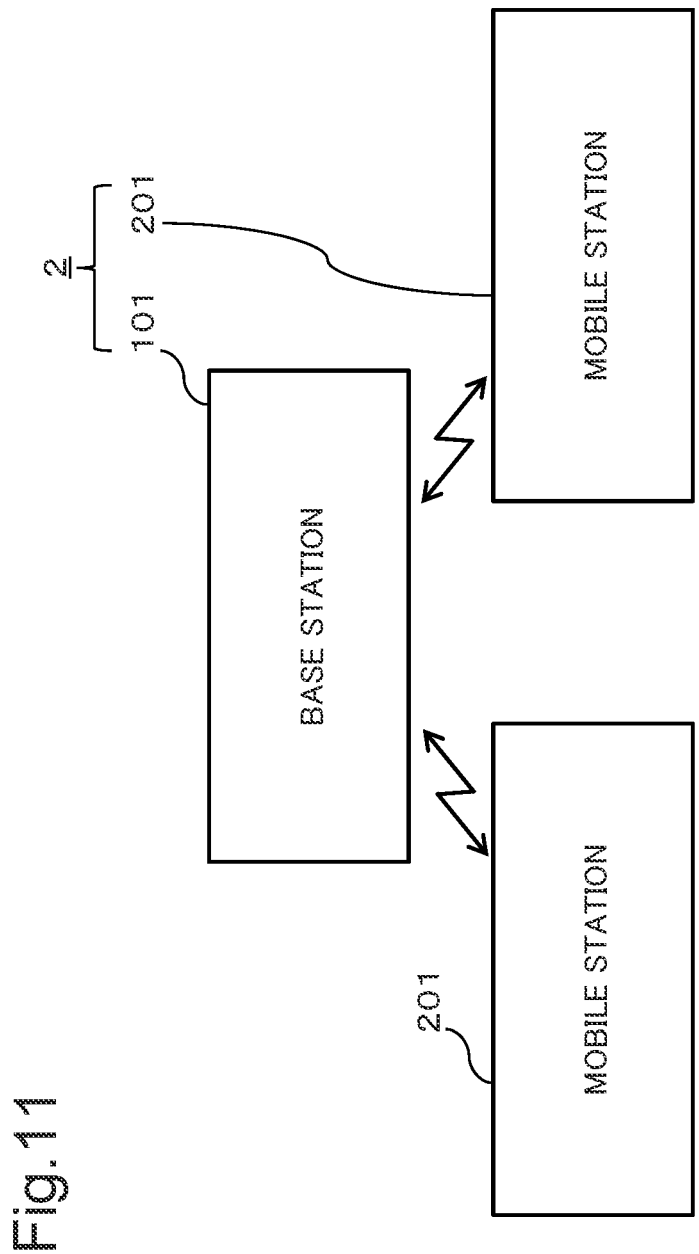
FIG. 11 is a diagram illustrating a configuration example of a communication system according to a second example embodiment.

With reference to the drawings, a communication system 2 according to a second example embodiment is described. FIG. 11 is a block diagram illustrating a configuration example of the communication system 2 according to the second example embodiment. The communication system 2 includes a base station 101 and a mobile station 201.

The communication system 2 is different from the communication system 1 according to the first example embodiment in that the mobile station 201 acquires information and that the base station 101 execute predetermined processing, based on the information provided from the mobile station 201. The other constituent elements are denoted with the equivalent reference symbols to those for the constituent elements in the first example embodiment, which are illustrated in FIG. 1 and the like, and description therefor is omitted.

The base station 101 and the mobile station 201 are configured to perform communication in accordance with specifications of LTE or the like, for example.

The base station 101 and the mobile station 201 can be connected to each other in order to communicate with each other via a wireless transmission path. For example, the base station 101 transmits a signal to the mobile station 201. For example, the base station 101 receives a signal transmitted from the mobile station 201. The mobile station 201 is a wireless communication device mounted to a vehicle such as an automobile, for example. The vehicle to which the mobile station 201 is mounted is also simply referred to as a mobile station.

Figure 12:
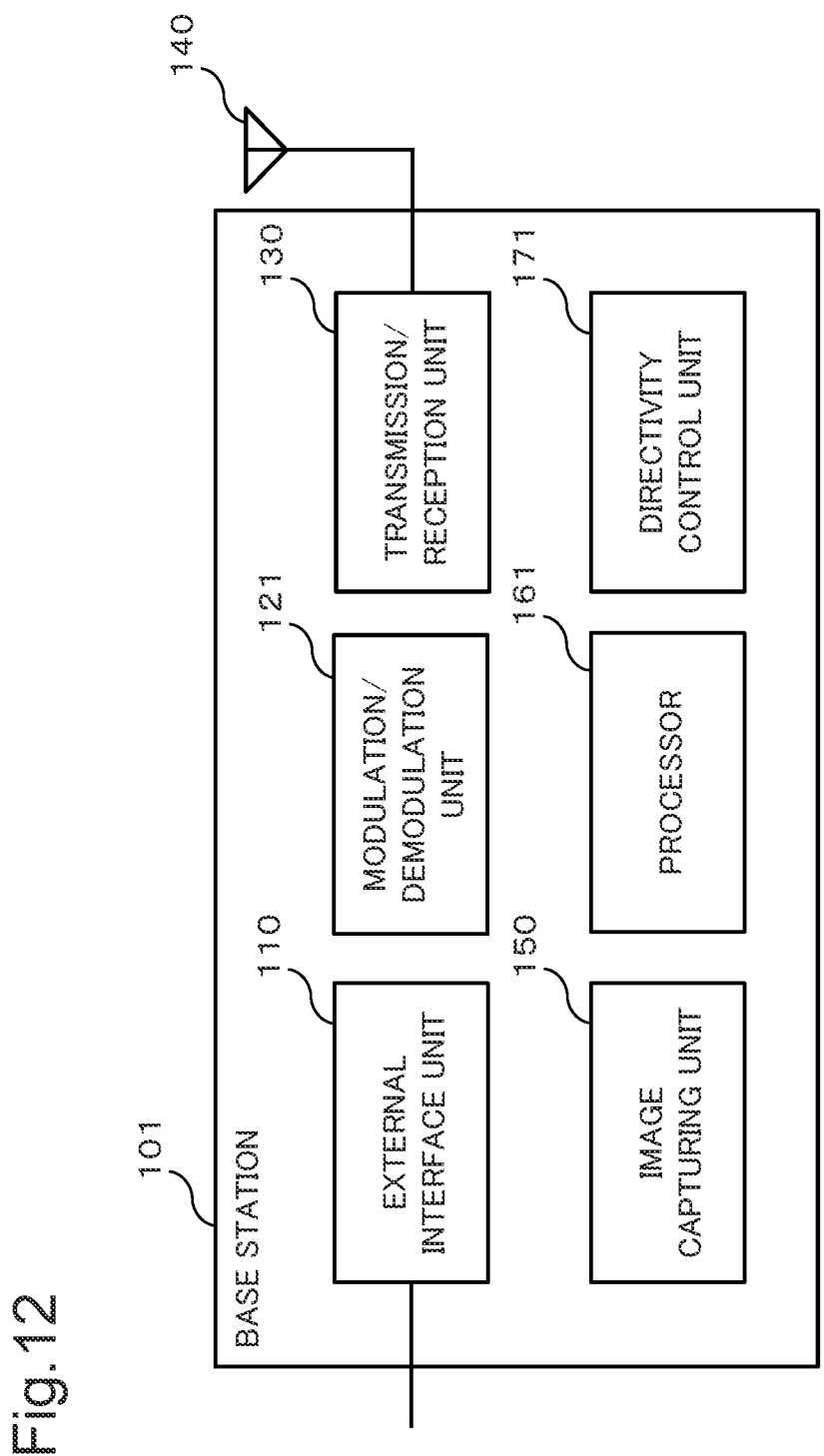
FIG. 12 is a block diagram illustrating a configuration example of a base station according to the second example embodiment.

FIG. 12 is a block diagram illustrating a configuration example of the base station 101. As illustrated in FIG. 12, the base station 101 includes an external interface unit 110, a modulation/demodulation unit 121, a transmission/reception unit 130, a variable directivity antenna 140, an image capturing unit 150, a processor 161, and a directivity control unit 171.

The modulation/demodulation unit 121 modulates a carrier wave in the communication data associated to the predetermined information. The modulation/demodulation unit 121 demodulates a carrier wave that has been modulated in predetermined communication data and transmitted by the mobile station 201, and has been received via the variable directivity antenna 140 and the transmission/reception unit 130, and acquires information associated to the predetermined communication data. In the present example embodiment, the modulation/demodulation unit 121 acquires information (hereinafter, also referred to as mobile station information) described below, for example.

Information indicating a motion of another mobile station 201 present in a periphery of the mobile station 201

Information indicating a position of the mobile station 201

Information indicating a traveling speed of the mobile station 201

Information indicating change in traveling speed of the mobile station 201

Information indicating lane change of the mobile station 201

The mobile station information is also referred to as information indicating a situation in the periphery of the mobile station 201 and a state of the mobile station 201. For example, the information indicating a motion of the another mobile station 201 present in the periphery of the mobile station 201 includes information indicating a traveling speed of the another mobile station 201 and information indicating a traveling direction of the another mobile station 201. For example, information indicating a traveling speed of the another mobile station 201 includes information indicating a traveling speed of the another mobile station 201 relative to the one mobile station 201 and information indicating an absolute traveling speed of the another mobile station 201. For example, information indicating a traveling direction of the another mobile station 201 includes information indicating a traveling direction of the another mobile station 201 relative to the one mobile station 201 and information indicating an absolute traveling direction of the another mobile station 201.

The processor 161 estimates a position and a traveling direction of the mobile station 201, based on the image information acquired by the image capturing unit 150 and the mobile station information. The processor 161 determines whether the one mobile station 201 and the another mobile station 201 are in the predetermined positional relationship, based on the image information acquired by the image capturing unit 150 and the mobile station information.

Specifically, for example, the processor 161 estimates a position of the one mobile station 201, a traveling speed of the one mobile station 201, a situation in the periphery of the one mobile station 201, whether the one mobile station 201 is scheduled to perform lane change, and the like, based on the mobile station information received from the one mobile station 201 in addition to the image information acquired by the image capturing unit 150, and determines whether the one mobile station 201 and the another mobile station 201 are in the predetermined positional relationship.

The processor 161 controls the directivity control unit 171, and controls communication between the base station 101 and the mobile station 201.

When it is determined that the one mobile station 201 and the another mobile station 201 are in the predetermined positional relationship, the processor 161 inputs, to the directivity control unit 171, information indicating that the one mobile station 201 and the another mobile station 201 are in the predetermined positional relationship (hereinafter, referred to as directivity control information).

The directivity control unit 171 controls a communication direction of the variable directivity antenna 140, based on the directivity control information input from the processor 161.

Specifically, for example, when the processor 161 determines that the one mobile station 201 and the another mobile station 201 are in the predetermined positional relationship, the directivity control unit 171 controls a communication direction of the variable directivity antenna 140 before the one mobile station 201 and the another mobile station 201 are in the predetermined positional relationship, in such a way that the base station 101 can communicate with the one mobile station 201 preferentially to the another mobile station 201. The specific method is equivalent to the method in the first example embodiment.

When the processor 161 determines that the one mobile station 201 and the another mobile station 201 are not in the predetermined positional relationship, the directivity control unit 171 controls a communication direction of the variable directivity antenna 140, in such a way that communication is performed equally with the plurality of mobile stations 201. The specific method is equivalent to the method in the first example embodiment.

Figure 13:
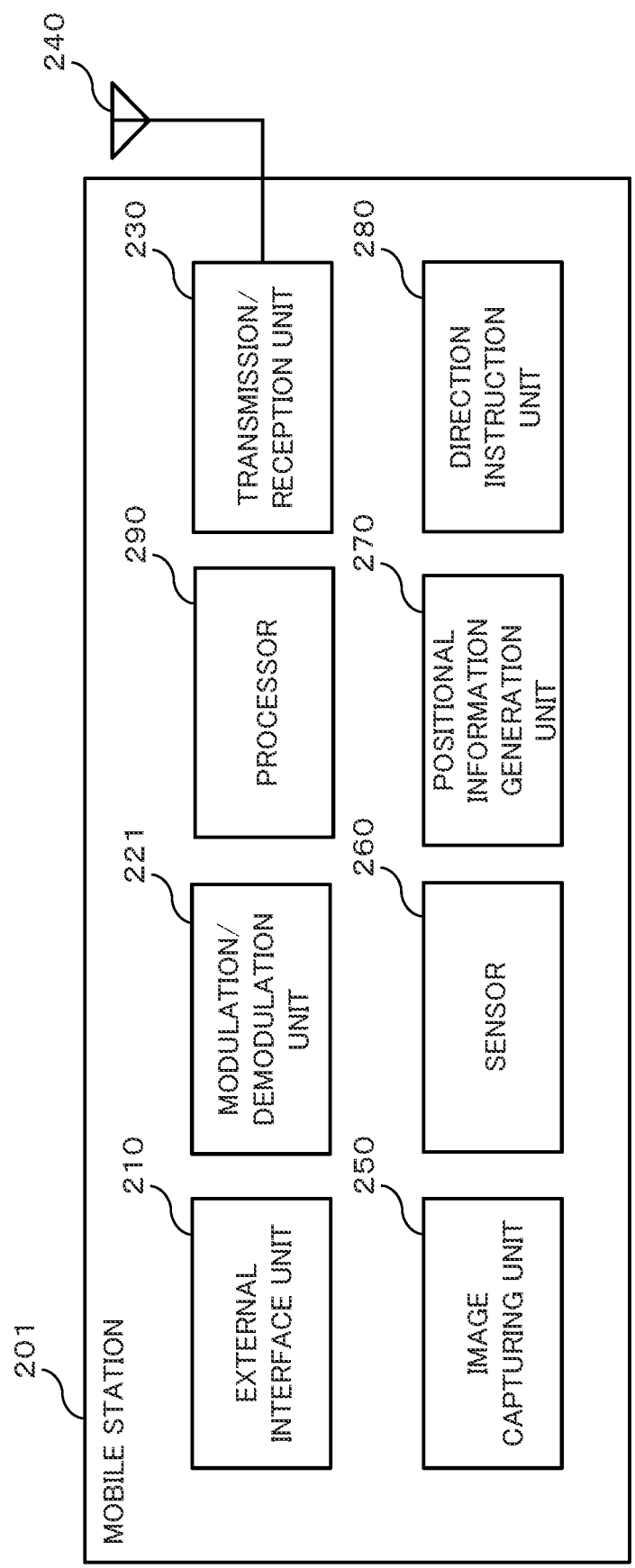
FIG. 13 is a block diagram illustrating a configuration example of a mobile station according to the second example embodiment.

FIG. 13 is a block diagram illustrating a configuration example of the mobile station 201. As illustrated in FIG. 13, the mobile station 201 includes an external interface unit 210, a modulation/demodulation unit 221, a transmission/reception unit 230, an image capturing unit 250, a sensor 260, a positional information generation unit 270, a direction instruction unit 280, and a processor 290, and is connected to an antenna 240.

The modulation/demodulation unit 221 modulates a carrier wave in the communication data associated to predetermined information. For example, the predetermined information is mobile station information generated by the processor 290.

The modulation/demodulation unit 221 demodulates a carrier wave that has been modulated in predetermined communication data and transmitted by the base station 101, and has been received via the antenna 240 and the transmission/reception unit 230, and acquires information associated to the predetermined communication data.

The image capturing unit 250 captures a predetermined range. For example, the image capturing unit 250 captures the periphery of the mobile station 201. For example, when the another mobile station 201 moving within in the periphery of the mobile station 201 is captured, the image capturing unit 250 acquires image information indicating an image of the another mobile station 201.

The sensor 260 acquires the information indicating change in traveling speed of the mobile station 201 and the information indicating a traveling direction of the mobile station 201. For example, the sensor 260 includes an acceleration sensor and a steering angle sensor (a steering sensor, a steering force angle meter, etc.). For example, the information indicating change in traveling speed of the mobile station 201 is information indicating temporal change in traveling speed of the mobile station 201.

The positional information generation unit 270 utilizes Global Positioning System (GPS) or the like, receives a signal from an artificial satellite or the like, and generates information indicating a position of the mobile station 201, based on the received signal.

The direction instruction unit 280 is a device that indicates a direction of a changed course to surroundings when the mobile station 201 turns right or left or changes its course. When the mobile station 201 turns right or left or changes its course, the direction instruction unit 280 inputs, to the processor 290, information indicating a direction of a changed course.

The processor 290 estimates a position of the mobile station 201, a traveling direction of the mobile station 201, a traveling speed of the mobile station 201, acceleration of the mobile station 201, a motion of the another mobile station 201 present in the periphery of the mobile station 201, and the like, based on image information acquired by the image capturing unit 250, the information indicating change in traveling speed of the mobile station 201 and the information indicating a traveling direction of the mobile station 201, which are acquired by the sensor 260, the information indicating a position of the mobile station 201, which is calculated by the positional information generation unit 270, and the information indicating a direction of a changed course, which is input from the direction instruction unit 280. The processor 290 generates the mobile station information, based on the estimation.

Specifically, for example, when the image information is a plurality of still images, the processor 290 recognizes feature points of the another mobile station 201, which are included in each of the plurality of still images, and generates information including information indicating a motion of the another mobile station 201 or the like, based on change in coordinate values of those feature points or the like. The information indicating a motion of the another mobile station 201 includes information indicating a traveling direction of the another mobile station 201 and a traveling speed of the another mobile station 201.

For example, the processor 290 generates the information indicating a traveling speed of the mobile station 201, based on temporal change in information indicating a position of the mobile station 201, which is calculated by the positional information generation unit 270, or the like.

For example, the processor 290 generates the information indicating change in traveling speed of the mobile station 201, based on the information acquired by the sensor 260.

For example, the processor 290 estimates whether the mobile station 201 performs lane change, based on the information indicating a traveling direction, which is acquired by the sensor 260, and the information input from the direction instruction unit 280. The processor 290 generates information indicating lane change of the mobile station 201, which includes information indicating whether the mobile station 201 performs lane change, based on the estimation. Specifically, for example, the processor 290 estimates whether a steering operation of the mobile station 201 has been performed, based on the information acquired by the sensor 260. The processor 290 estimates whether an operation of the direction instruction unit 280 has been performed, based on the information input from the direction instruction unit 280. The processor 290 may be configured to estimate whether the mobile station 201 performs lane change, based on those estimated factors. The processor 290 may be configured to estimate whether the mobile station 201 performs lane change, based on the estimated factors described above.

The processor 290 inputs the generated mobile station information to the modulation/demodulation unit 221.

According to the present example embodiment, the base station 101 determines whether the one mobile station 201 and the another mobile station 201 are in the predetermined positional relationship, based on the image information captured by the image capturing unit 150 and the mobile station information. When the base station 101 determines that the one mobile station 201 and the another mobile station 201 are in the predetermined positional relationship, a time slot set for the another mobile station 201 is used for communication with the one mobile station 201.

According to this configuration, the base station can appropriately communicate with the mobile station in a situation where communication may be disabled. For example, when there is a risk in that communication with the one mobile station is disrupted, the base station can allocate a wireless line to the one mobile station preferentially to the another mobile station.

For example, in a period during which there may be a risk in that communication with the one mobile station is disrupted, the base station communicates with the another mobile station. Therefore, the base station can improve usage efficiency of the wireless line.

For example, the base station controls the variable directivity antenna, based on the acquired image information. Therefore, the base station can appropriately recognize a moving direction of the mobile station, and can control a communication direction of the variable directivity antenna efficiently.

Moreover, the base station determines whether the one mobile station and the another mobile station are in the predetermined positional relationship, by considering the mobile station information in addition to the image information captured by the base station. Therefore, the base station can perform the determination described above more accurately according to a situation of the periphery of the mobile station or a state of the mobile station. Thus, the base station can control a communication direction of the variable directivity antenna more efficiently, and can use a wireless line more efficiently.

The mobile station 201 may be configured to transmit the mobile station information to the base station 101 through use of a signal having a frequency in a micro wave band (a UHF band, etc.). A signal having a frequency in a micro wave band has a characteristic of going round behind an obstacle or the like. Therefore, in a case where a signal having a frequency in a micro wave band is used, even when an obstacle is present between the base station 101 and the mobile station 201, a possibility that the base station 101 can receive the mobile station information transmitted from the mobile station 201 can be improved.

The mobile station 201 may be configured to transmit information indicating a vehicle type, a vehicle size, and the like of the mobile station 201 to the base station 101. The base station 101 may be configured to determine whether the one mobile station 201 and the another mobile station 201 are in the predetermined positional relationship, based on the image information captured by the base station, the mobile station information, and the information indicating a vehicle type, a vehicle size, and the like of the mobile station 201.

The base station 101 may be configured to request the mobile station 201 for the mobile station information. The mobile station 201 may be configured to transmit the mobile station information to the base station 101, based on the request. Specifically, for example, the base station 101 transmits the request when communication can be performed with the mobile station 201. The mobile station 201 may be configured to transmit the mobile station information to the base station 101, based on the request.

The base station 101 may be configured to acquire the information indicating a vehicle type, a vehicle size, and the like of the mobile station 201 through use of Electronic Toll Collection System (ETC). The base station 101 may be configured to determine whether the one mobile station 201 and the another mobile station 201 are in the predetermined positional relationship, based on the information acquired through use of ETC, the image information captured by the base station, and the mobile station information.

The modulation/demodulation unit 121 is achieved by a transmission circuit and a reception circuit.

The processor 161 and the directivity control unit 171 are achieved by a CPU that executes processing in accordance with program control, a plurality of circuits, a memory, and the like.

The modulation/demodulation unit 221 is achieved by a transmission circuit and a reception circuit.

The image capturing unit 250 is achieved by a CPU that executes processing in accordance with program control, a plurality of circuits, a memory, a camera, and the like.

The sensor 260 is achieved by a CPU that executes processing in accordance with program control, a plurality of circuits, a memory, an acceleration sensor, a steering wheel angle sensor (a steering sensor, a steering force angle meter, etc.), and the like.

The positional information generation unit 270 is achieved by a CPU that executes processing in accordance with program control, a plurality of circuits, a memory, a GPS receiver, and the like.

The direction instruction unit 280 is achieved by a CPU that executes processing in accordance with program control, a plurality of circuits, a memory, a lamp, and the like.

The processor 290 is achieved by a CPU that executes processing in accordance with program control, a plurality of circuits, a memory, and the like.

Third Example Embodiment

Subsequently, with reference to the drawings, a base station 10 according to a third example embodiment is described.

Figure 14:
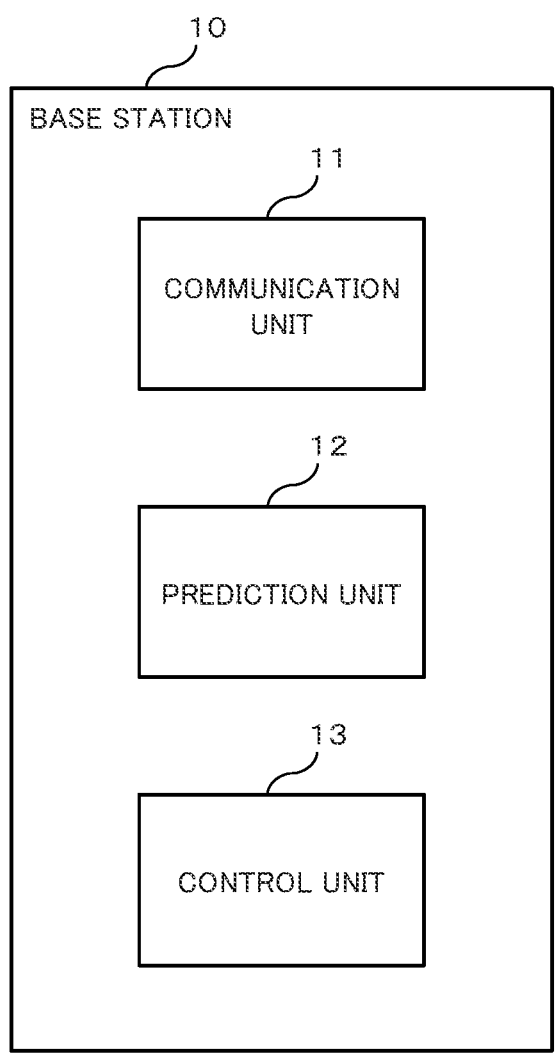
FIG. 14 is a block diagram illustrating a configuration example of a base station according to a third example embodiment.

FIG. 14 is a block diagram illustrating a configuration example of the base station 10 according to the third example embodiment. As illustrated in FIG. 14, the base station 10 includes a communication unit 11, a prediction unit 12, and a control unit 13.

For example, the base station 10 is equivalent to the base station 100 according to the first example embodiment, which is illustrated in FIG. 1. For example, the base station 10 is equivalent to the base station 101 according to the second example embodiment, which is illustrated in FIG. 11.

For example, the communication unit 11 is equivalent to the modulation/demodulation unit 120 and the transmission/reception unit 130 according to the first example embodiment, which are illustrated in FIG. 2. For example, the communication unit 11 is equivalent to the modulation/demodulation unit 121 and the transmission/reception unit 130 according to the second example embodiment, which are illustrated in FIG. 12.

For example, the prediction unit 12 is equivalent to the processor 160 according to the first example embodiment, which is illustrated in FIG. 2, or to the processor 161 according to the second example embodiment, which is illustrated in FIG. 12.

The communication unit 11 communicates with a mobile station. For example, the mobile station is equivalent to the mobile station 200 according to the first example embodiment, which is illustrated in FIG. 1, or to the mobile station 201 according to the second example embodiment, which is illustrated in FIG. 11.

The prediction unit 12 predicts a period during which communication with the mobile station is blocked. For example, the period during which communication with the mobile station is blocked is equivalent to the period from the time T4 to the time T8 illustrated in FIG. 7.

The control unit 13 controls the communication unit 11 in such a way that communication data to be transmitted to the mobile station in the period during which communication is blocked are transmitted during a period before the period during which communication is blocked. For example, the period before the period during which communication is blocked is equivalent to the period from the time T0 to the time T4 illustrated in FIG. 7.

According to the present example embodiment, the base station 10 communicates with the mobile station. The base station 10 predicts the period during which communication with the mobile station is blocked. The base station 10 controls the communication unit in such a way that the communication data to be transmitted to the mobile station in the period during which communication is blocked are transmitted in the period before the period during which communication is blocked.

Therefore, the base station 10 can appropriately communicate with the mobile station in a situation where communication may be disabled.

The example embodiments according to the present disclosure are described above, but the present disclosure is not limited to each of the example embodiments described above. The present disclosure can be carried out based on modification, replacement, and adjustment of each of the example embodiments. The present disclosure can also be carried out by combining the example embodiments to one another in a freely selected manner. Specifically, the present disclosure encompasses all the disclosed contents in description and various modifications and amendment that can be achieved by following the technical idea. The drawing reference symbol denoted in each of the drawings is denoted for each element as an example for convenience and better understanding, and is not intended to limit the present disclosure to the illustrated aspects.

A part or the entirety of the example embodiments described above may be described as in the following supplementary notes, but is not limited to the following.

(Supplementary Note 1)
A base station, including:
a communication means for communicating with a mobile station;
a prediction means for predicting a period during which communication with the mobile station is blocked; and
a control means for controlling the communication means in such a way that communication data to be transmitted to the mobile station in the period during which communication is blocked are transmitted in a period before the period during which communication is blocked.

(Supplementary Note 2)
The base station according to supplementary note 1, further including:
a capturing means for acquiring image information relating to the mobile station, wherein
the prediction means predicts the period during which communication is blocked, based on the image information.

(Supplementary Note 3)
The base station according to supplementary note 2, wherein
the prediction means recognizes the mobile station and an obstacle that blocks communication between the communication means and the mobile station, based on the image information, and
the prediction means predicts the period during which communication is blocked, the period being caused by the obstacle.

(Supplementary Note 4)
The base station according to any one of supplementary notes 1 to 3, wherein
the control means controls the communication means in such a way that the communication data are transmitted in a period before the period during which communication is blocked, by allocating a wireless resource to the mobile station, the wireless resource being used for communication with another mobile station different from the mobile station.

(Supplementary Note 5)
The base station according to any one of supplementary notes 1 to 4, wherein
the control means controls the communication means in such a way that communication is performed with another mobile station different from the mobile station in the period during which communication is blocked.

(Supplementary Note 6)
The base station according to supplementary note 5, wherein
the control means controls the communication means in such a way that a wireless resource to be used for communication with the mobile station is allocated to the another mobile station in the period during which communication is blocked and that communication with the another mobile station is performed.

(Supplementary Note 7)
The base station according to any one of supplementary notes 1 to 6, wherein
the communication means receives information indicating a situation in a periphery of the mobile station and a state of the mobile station from the mobile station, and
the prediction means predicts the period during which communication is blocked, based on the information indicating the situation in the periphery of the mobile station and the state of the mobile station.

(Supplementary Note 8)
The base station according to any one of supplementary notes 1 to 7, wherein
the communication means communicates with the mobile station through use of a variable directivity antenna.

(Supplementary Note 9)

A communication system, including:

the base station according to any one of supplementary notes 1 to 8; and the mobile station that communicates with the base station.

(Supplementary Note 10)

A communication method, including:

predicting a period during which communication with a mobile station is blocked; and controlling communication with the mobile station in such a way that communication data to be transmitted to the mobile station in the period during which communication is blocked are transmitted in a period before the period during which communication is blocked.

(Supplementary Note 11)

A communication method, including:

predicting a period during which communication with a mobile station is blocked;

controlling communication with the mobile station in such a way that communication data to be transmitted to the mobile station in the period during which communication is blocked are transmitted in a period before the period during which communication is blocked; and communicating according to the controlling.

(Supplementary Note 12)

A communication control program causing a computer to execute:

communication processing of communicating with a mobile station;

prediction processing of predicting a period during which communication with the mobile station is blocked; and control processing of controlling communication with the mobile station in such a way that communication data to be transmitted to the mobile station in the period during which communication is blocked are transmitted in a period before the period during which communication is blocked.

While the disclosure has been particularly shown and described with reference to exemplary embodiments thereof, the disclosure is not limited to these embodiments. It will be understood by those of ordinary skill in the art that various changes in form and details may be made therein without departing from the spirit and scope of the present disclosure as defined by the claims.

This application is based upon and claims the benefit of priority from Japanese patent application No. 2018-132331, filed on Jul. 12, 2018, the disclosure of which is incorporated herein in its entirety by reference.

REFERENCE SIGNS LIST 1, 2 Communication system
10, 100, 101 Base station
11 Communication unit
12 Prediction unit
13 Control unit
110, 210 External interface unit
120, 121, 220, 221 Modulation/demodulation unit
130, 230 Transmission/reception unit
140 Variable directivity antenna
150, 250 Image capturing unit
160, 161, 290 Processor
170, 171 Directivity control unit
200, 200-1, 200-2, 200-3, 200-4, 201 Mobile station
240 Antenna
260 Sensor
270 Positional information generation unit
280 Direction instruction unit
300 Roadway
400, 401, 402, 403, 404, 405, 406, 407, 408, 409, 410, 411, 412, 413, 414, 415 Time slot
500 Communication area

What is claimed is:

1. A base station, comprising:
a communication circuit configured to communicate with a mobile station;
a prediction circuit configured to predict a period during which communication with the mobile station is blocked; and
a controller configured to control the communication circuit in such a way that communication data to be transmitted to the mobile station in the period during which communication is blocked are transmitted in a period before the period during which communication is blocked, wherein
the communication circuit receives information indicating a situation in a periphery of the mobile station and a state of the mobile station, from the mobile station, and
the prediction circuit predicts the period during which communication is blocked, based on the information indicating the situation in the periphery of the mobile station and the state of the mobile station.

2. The base station according to claim 1, further comprising
a capture circuit configured to acquire image information relating to the mobile station, wherein
the prediction circuit predicts the period during which communication is blocked, based on the image information.

3. The base station according to claim 2, wherein
the prediction circuit recognizes the mobile station and an obstacle that blocks communication between the communication circuit and the mobile station, based on the image information, and
the prediction circuit predicts the period during which communication is blocked, the period being caused by the obstacle.

4. The base station according to claim 1, wherein
the controller controls the communication circuit in such a way that the communication data are transmitted in the period before the period during which communication is blocked, by allocating a wireless resource to the mobile station, the wireless resource being used for communication with another mobile station different from the mobile station.

5. The base station according to claim 1, wherein
the controller controls the communication circuit in such a way that communication is performed with another mobile station different from the mobile station in the period during which communication is blocked.

6. The base station according to claim 5, wherein
the controller controls the communication circuit in such a way that a wireless resource to be used for communication with the mobile station is allocated to the another mobile station in the period during which communication is blocked and that communication with the another mobile station is performed.

7. A communication system, comprising:
the base station according to claim 1; and
the mobile station that communicates with the base station.

8. A communication method, comprising:

receiving information indicating a situation in a periphery of the mobile station and a state of the mobile station, from the mobile station;

predicting a period during which communication with a mobile station is blocked, based on the information indicating the situation in the periphery of the mobile station and the state of the mobile station; and controlling communication with the mobile station in such a way that communication data to be transmitted to the mobile station in the period during which communication is blocked are transmitted in a period before the period during which communication is blocked.

9. The communication method according to claim 8, further comprising:

communicating according to the controlling.

10. A non-transitory storing medium in which a communication control program is stored, the communication control program causing a computer to execute:

receiving information indicating a situation in a periphery of the mobile station and a state of the mobile station, from the mobile station;

predicting a period during which communication with a mobile station is blocked, based on the information indicating the situation in the periphery of the mobile station and the state of the mobile station; and controlling communication with the mobile station in such a way that communication data to be transmitted to the mobile station in the period during which communication is blocked are transmitted in a period before the period during which communication is blocked.

11. The base station according to claim 1, wherein the communication circuit communicates with the mobile station through use of a variable directivity antenna.

* * * * *